US00RE33999E

United States Patent [19]

Clare et al.

[11] E Patent Number: Re. 33,999

[45] Reissued Date of Patent: Jul. 21, 1992

[54] METHOD OF REMOVING WATER FROM CRUDE OIL CONTAINING SAME

[75] Inventors: Ronald T. Clare; Wayne J. N. Egan, both of Calgary, Canada

[73] Assignee: Colt Engineering Corporation, Calgary, Canada

[21] Appl. No.: 624,586

[22] Filed: Dec. 6, 1990

Related U.S. Patent Documents

Reissue of:

[64] Patent No.: 4,789,461
Issued: Dec. 6, 1988
Appl. No.: 892,380
Filed: Aug. 4, 1986

U.S. Applications:

[63] Continuation-in-part of Ser. No. 554,471, Nov. 22, 1983, abandoned.

[51] Int. Cl.[5] ..... C10G 33/00

[52] U.S. Cl. ..... 208/187; 208/359; 210/DIG. 6; 159/3

[58] Field of Search ..... 208/187, 359; 159/3

[56] References Cited

U.S. PATENT DOCUMENTS

| | | | |
|---|---|---|---|
| 1,559,036 | 10/1925 | Egloff et al. | 208/187 |
| 3,091,098 | 5/1963 | Bowers | 159/3 |
| 3,318,803 | 5/1967 | Broughton | 208/187 |
| 3,411,992 | 11/1968 | Mitchell | 159/3 |
| 3,441,499 | 4/1969 | Francis, Jr. et al. | 208/187 |
| 3,453,205 | 7/1969 | Francis, Jr. et al. | 208/187 |
| 3,474,764 | 10/1969 | Sargent | 159/3 R |
| 3,622,466 | 11/1971 | West | 159/3 R |
| 3,847,616 | 11/1974 | Kaneko et al. | 159/3 |
| 3,853,672 | 12/1974 | Gordon et al. | 159/3 |
| 3,888,760 | 6/1975 | Ebert | 208/187 |
| 3,923,643 | 12/1975 | Lewis et al. | 208/187 |
| 4,197,190 | 4/1980 | Foster | 208/187 |
| 4,273,611 | 6/1981 | Blasio et al. | 208/187 |
| 4,617,272 | 10/1986 | Kirkwood et al. | 159/3 |
| 4,623,447 | 11/1986 | Clampitt et al. | 208/187 |

FOREIGN PATENT DOCUMENTS

| | | | |
|---|---|---|---|
| 1122135 | 4/1982 | Canada | 208/187 |

*Primary Examiner*—Helane Myers
*Attorney, Agent, or Firm*—Burns, Doane, Swecker & Mathis

[57] ABSTRACT

A method and apparatus for removing residual water from heavy crude oil comprising a casing, an inlet for admitting liquid crude oil into the casing so as to establish a liquid surface in the casing, an outlet passage for discharging dehydrated liquid crude oil from the casing, a heater in the casing for maintaining the liquid oil at a distillation temperature for evaporating water and light hydrocarbons, a vapor outlet for discharging a mixture of water vapor and light hydrocarbons evaporated from the crude oil, a spray device above the surface of the liquid in the casing for spraying incoming crude oil onto and in heat exchange contact with the surface of the heated oil in the casing, whereby water and light hydrocarbon vapors are distilled from incoming crude oil upon contact with the surface of the heated liquid crude oil.

14 Claims, 2 Drawing Sheets

METHOD OF REMOVING WATER FROM CRUDE OIL CONTAINING SAME

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of co-pending application Ser. No. 554,471 filed Nov. 22, 1983 and now abandoned.

This invention relates to a method and apparatus for treating crude oil and in particular heavy hydrocarbon crude oil.

BACKGROUND AND OBJECTS OF THE INVENTION

In the treatment of heavy hydrocarbons at or near producing wells it is desirable to remove all or virtually all of the water entrained in the oil. In general, water can be removed from the oil simply by heating the mixture to boil the water. However, such boiling for example in a storage tank, results in the evolution of steam which creates large quantities of foam formed from steam bubbles in an oil film. The foaming is, at best, difficult to control and often forms a spill with a volume many times greater than the volume of the liquid.

Apparatus for treating crude oil is known, for example from Canadian Patent No. 1,122,135 issued to Koppers Company, Inc., on Apr. 20, 1982 and U.S. Pat. Nos. 3,441,499 and 3,453,205 both issued to A. W. Francis, Jr. et al on Apr. 26, 1969 and Jul. 1, 1969 respectively. In general, currently available dehydrators rely on differences in the specific gravity of oil and water to effect gravity separation. The gravity separators use a heat source to raise the temperature of the crude oil which reduces the viscosity of the oil to promote phase separation. Such a process is not particularly effective for heavy crude oils which have specific gravities close to that of water. The addition of emulsion breaker have often proved to be of little value.

Other dehydrators utilize vacuum towers combined with heaters for removing water as steam below atmospheric pressure. The vacuum is created by vapor compressors which condense or flare the resulting pressurized steam to the atmosphere. Such a method requires many separate pieces of equipment, is expensive and is best suited to large central plant facilities. Controlled boiling has also been attempted using tray-type towers or expensive heat exchangers.

A further problem in the past is that removal of the water usually leaves residual salts which had been contained in the water, resulting in corrosion. Such salts can accumulate in the apparatus, clogging the tubing and other parts, as well as causing corrosion thereof.

Therefor, a primary object of the present invention is to provide a relatively simple, easy to operate apparatus which can be located in remote oil producing areas for dehydrating crude oil.

Another object of the invention is to provide a method of dehydrating oil which is relatively easy to carry out even in remote areas.

Still another object of the invention is to provide a method and apparatus in which the incoming crude oil is heated at the surface of a bath of crude oil, in such a manner as to minimize the temperature gradient within the bath itself as further crude oil is introduced into the bath.

Yet a further object of the invention is to provide a method and apparatus in which the primary heat transfer between cooler, incoming crude oil and the already heated bath occurs at the surface of the bath of crude oil rather than to a significant depth in the bath, so the temperature gradient within the bath itself is minimized.

Another object of the invention is to provide a method and apparatus for dehydrating crude oil which may employ preliminary separating steps for improving the quality of the incoming crude oil even before it enters the apparatus of the invention for further improving the results of the invention.

A further object of the invention is to provide a method and apparatus for dehydrating crude oil in which a portion of the dehydrated crude oil produced may be recycled, if desired, to the beginning of the process and mixed with crude oil prior to its introduction into the heating chamber for pre-heating incoming crude, thereby further minimizing the temperature gradient within the heating chamber and minimizing the amount of heat required to be added to the system.

These and other objects and advantages of the present invention will become apparent from a further consideration of the details of the invention which follow.

SUMMARY OF THE INVENTION

The present invention relates to an apparatus for dehydrating crude oil containing water, comprising a casing, means for admitting liquid crude oil into the casing, means for controlling the quantity of crude oil in the casing in order to establish the liquid level and particularly the surface of the liquid at or within an essentially constant range in the casing, and a heater for maintaining the liquid oil in the casing at or above a distillation temperature for evaporating water and lighter hydrocarbons. The means for admitting the crude oil includes a spray arrangement by which the incoming crude oil is sprayed from above onto the surface of the heated crude oil already in the casing. Above the spray arrangement in the top of the casing is an outlet duct for discharging a vapor mixture of water and light hydrocarbons which have been distilled from the crude oil.

By virtue of this apparatus, the incoming crude oil which is sprayed onto the surface of the liquid already in the casing is heated as it contacts the surface of the heated liquid. The heating element is in the liquid which is largely dehydrated, and in this manner, the heating element does not come into as great contact with the incoming crude which contains the water and salts dissolved therein. If the heating element were simply immersed into the raw crude oil containing water and salts dissolved therein, the evaporation of water adjacent to its contact with the heating element would deposit any dissolved salts on the heating element. However, using the present apparatus, wherein the water evaporates from the surface of the bath out of direct contact with the heating element, the salts tend to remain dissolved in the oil, and are carried off with the oil.

The water is evaporated more quickly and efficiently at the surface of the liquid which helps to minimize the heat loss and temperature gradient which would otherwise occur when a cold liquid is sprayed onto a hot liquid. Further, the spraying helps to minimize any foaming of the liquid at the surface. Since the spraying is countercurrent to the rising distillate in the casing, the lighter hydrocarbon fractions which are being distilled simultaneously with the water help to strip additional hydrocarbons from the incoming crude oil.

The water and light (or lower boiling) hydrocarbon vapor mixture which is distilled off is condensed in a suitable condenser and the mixture is then separated. A portion of the recovered light hydrocarbon liquid may be mixed with the incoming crude oil, if desired, before it enters the casing-, to dilute the incoming crude and thereby facilitate its further treatment.

The heavier, dehydrated crude oil containing salts from the water dissolved therein, is drawn off through the bottom of the casing. In an optional embodiment, the discharge duct may include a branch line connected to a recycle line which is controlled by a valve connected to a liquid level controller, for controlling the level of liquid in the casing at a predetermined point or within a predetermined range. Using such a level controller, it is possible to automatically maintain the level of the liquid between the immersed heating element and the spray bar.

In still another embodiment, the apparatus may include a preliminary treater means for separating water and entrained solids from the oil by gravity before the crude is introduced into the casing, if such solid material is a particular problem with the crude oil being treated.

The invention also relates to a method for dehydrating crude oil containing water which includes dehydrating the crude oil by spraying the incoming crude into a casing which contains a quantity of crude oil heated by a heater immersed in the oil, in order to bring about evaporation of the water in the crude oil and generate a mixture of steam and light hydrocarbon vapors. The heat exchange takes place largely at the surface of the heated liquid, and this surface is maintained between the level of the spray bar and the heating element. The spraying action itself generates a degree of turbulence which aids in the heat transfer between the incoming crude oil and the heated bath.

The mixture of water vapor and light hydrocarbons is then drawn off, condensed and separated, while the dehydrated heavy crude oil is removed from the lower portion of the casing and further processed in a known manner, for example to fractionate the crude oil.

In an additional embodiment, the process may include continuously returning at least a portion of the light hydrocarbons, after they have been separated from the water, to mix with the incoming crude oil for diluting the incoming crude oil and promoting a more efficient separation of oil and water.

It is preferable that the dehydrated oil have a water content of less than 0.5% by volume to be acceptable for pipeline transmission to a refinery. Such oil is produced by the present process and is readily saleable, particularly in the case of heavy crude oils with specific gravities near or less than that of the produced and accompanying water.

BRIEF DESCRIPTION OF THE DRAWINGS

The invention will now be described in greater detail with reference to the accompanying drawings which illustrate a preferred embodiment of the apparatus of the present invention and wherein.

DESCRIPTION OF THE PREFERRED EMBODIMENT(S)

Figure 1:
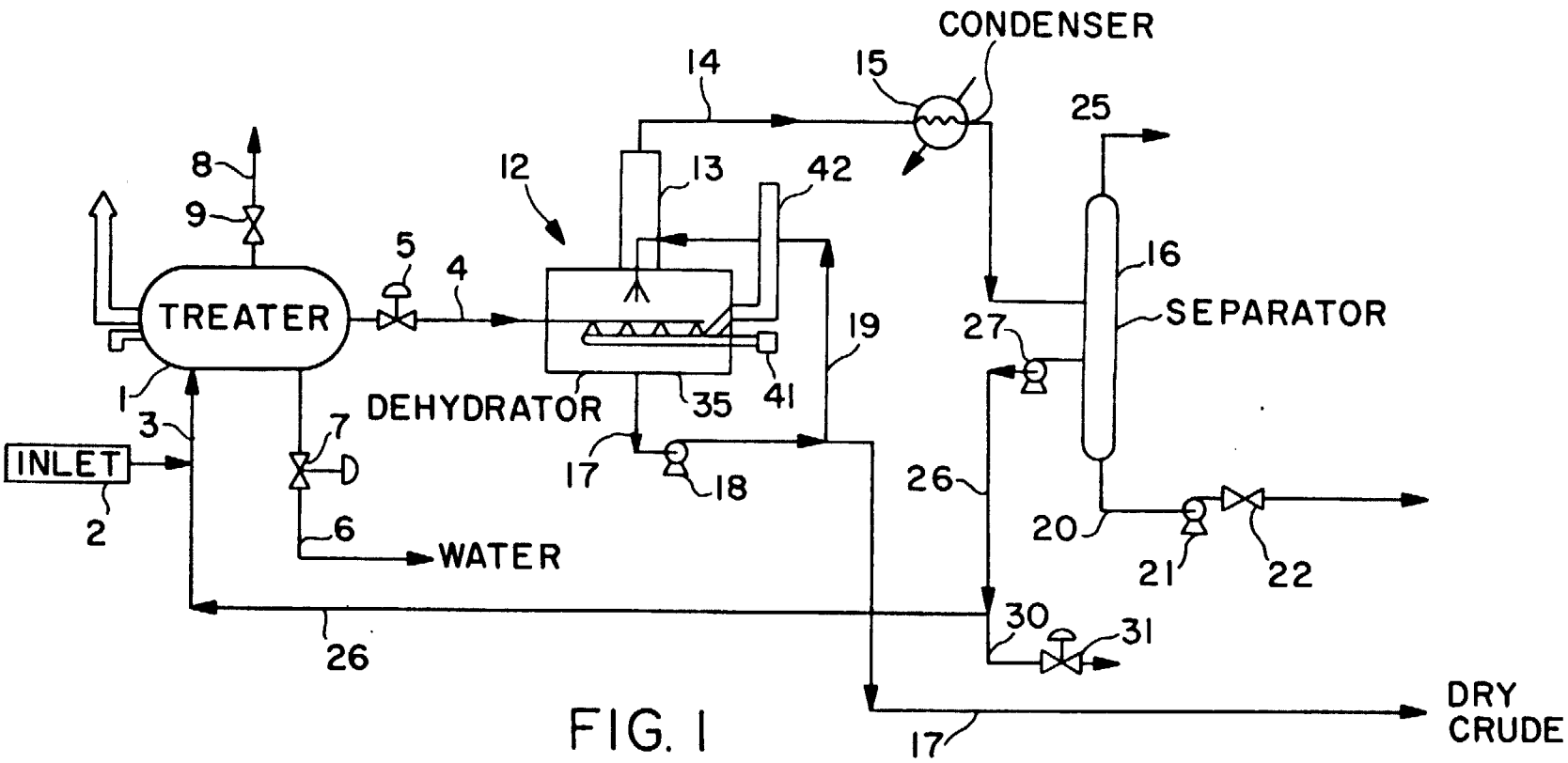
FIG. 1 is a schematic flow diagram of one form of a system using the apparatus in accordance with the present invention, showing an optional preliminary treater and optional recycle of a portion of dehydrated crude oil.
Figure 3:
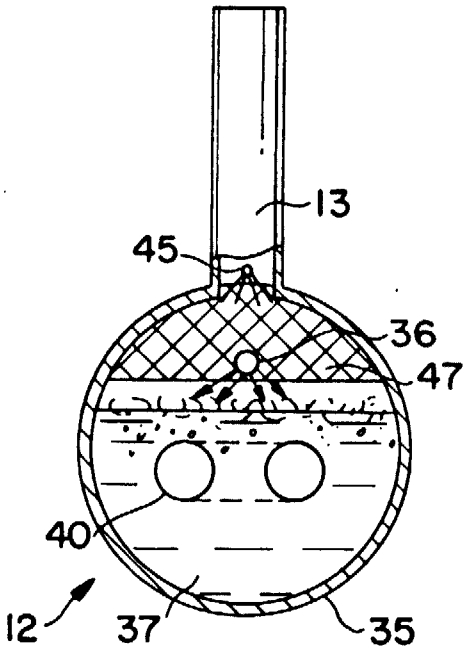
FIG. 3 is a cross section taken along line III—III of FIG. 2.

With reference to FIG. 1, a system using the apparatus of the present invention includes an optional treater or gravity separator 1 for receiving crude oil from an inlet 2 via line 3. The fluid entering the treater 1 is a mixture of oil, water and solid particles such as clays metals and silicas. The pressure treater 1 is a commercially available item which operates at pressures from zero to 700 kpa or more, at a temperature of 80° to 140° C. In this treater 1, solid particles along with some water may be removed by gravity separation and discharged through valve 7 and line 6. Lighter, unstable hydrocarbon components are discharged from the treater 1 through a vent 8 and a regulating valve 9.

Crude oil from the treater 1 is discharged through a line 4 and valve 5 where it enters a dehydrating apparatus according to the invention, generally indicated at 12, and which is described hereinafter in greater detail. In the dehydrator 12 oil and water are separated by distillation, with the water and low boiling temperature hydrocarbon components of the oil rising through a column 13 and passing out through a line 14. If desired, the water and lower boiling components may be sent to a condenser 15 and then to a vaporliquid separator 16. Dehydrated, higher boiling crude oil is discharged from the dehydrator 12 through line 17 and a pump 18. Some of the dehydrated oil may be returned to the dehydrator 12 through line 19 in the form of a spray countercurrent to the rising vapors for stripping additional hydrocarbon distillate from the vapors in column 13.

In the optional separator 16, water and hydrocarbon distillate may be separated by virtue of their different specific gravities. The separated water may then be discharged through outlet line 20, a pump 21 and a valve 22. A rising liquid level in the separator 16 causes the valve 22 to open so that the pump 21 discharges the water to storage (not shown). Light, non-condensable components, are discharged from the separator 16 through vent line 25.

Light hydrocarbon liquid, which has a specific boiling point range determined by the operating temperature of dehydrator 12, and which is stable at atmospheric temperature and pressure may optionally be returned to the pressure treater 1 through pipe 26 and line 3 via pump 27 for diluting the incoming raw crude oil. The light hydrocarbon liquid can also be withdrawn from the system through a line 30 and a valve 31, if it is not desired to recycle it for dilution.

Figure 2:
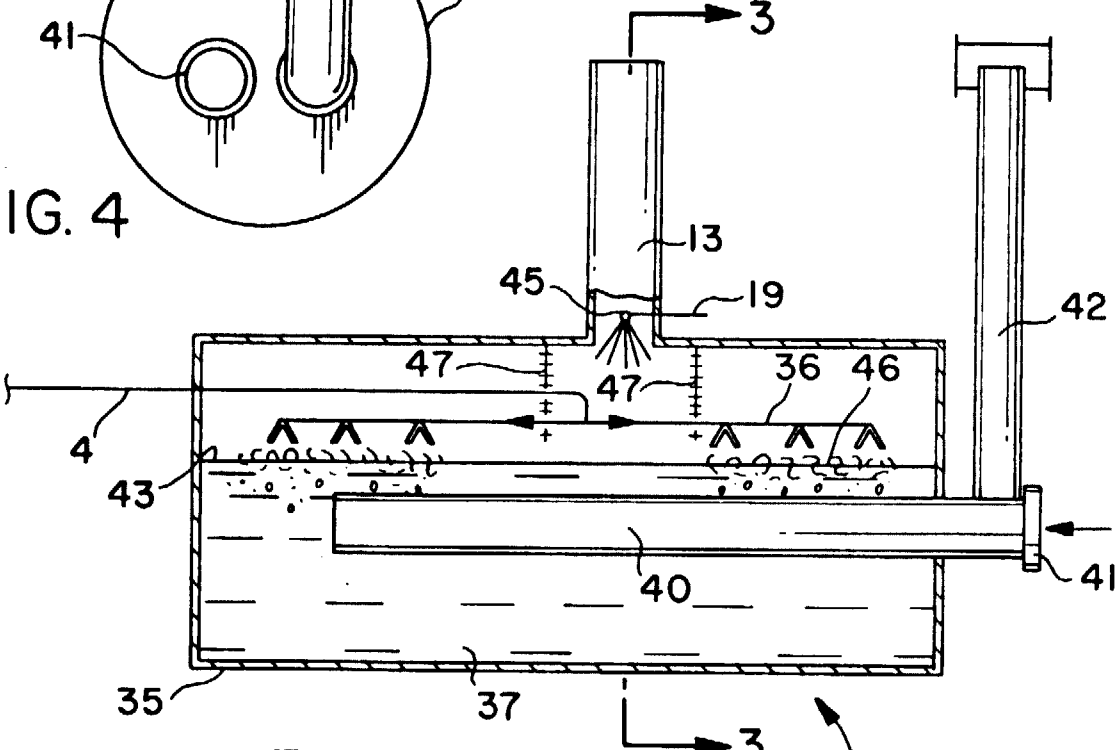
FIG. 2 is a schematic longitudinal sectional view of a dehydrator apparatus according to this invention, such as may be used in the system of FIG. 1, and taken generally along line II—II of FIG. 3.
Figure 4:
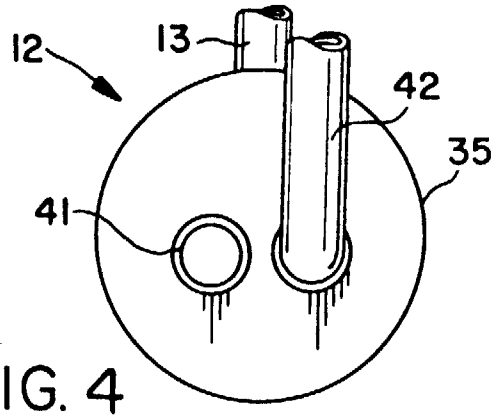
FIG. 4 is an end view of the dehydrator of FIGS. 2 and 3.

In operation of the system shown, including the optional embodiments, crude oil comprising oil, water and solids enters the treater 1. In the treater 1 the crude oil is treated to reduce the water, emulsion and solids content of the oil. The crude oil and emulsions flow into the dehydrator 12 where the liquid is evenly distributed on the surface 43 of the oil bath 37 (FIG. 2). Water is liberated as steam and is discharged from the dehydrator 12 with light or low boiling hydrocarbons, through the line 14 to the condenser 15. The vapors are converted to liquid water and hydrocarbons which are fed into the separator. In the separator the water and hydrocarbon condensate (both now liquid) are separated.

The light hydrocarbon liquid is returned to the treater 1 through the line 26. The liquid is, in effect, a synthetic, tailormade diluent or solvent, which is readily soluble in the raw crude oil. The composition of the liquid can be altered by controlling the temperature and pressure in the dehydrator 12 and the temperature in the condenser 15. For example, higher temperatures and/or lower pressures in the dehydrator 12 will encourage separation of heavier or higher boiling point components of the crude oil.

With further reference to FIG. 1, the dehydrator apparatus 12 of the present invention includes a casing 35 for receiving the incoming crude oil which contains water. The fluid entering the dehydrator 12 flows into a spray tube 36 positioned slightly above the surface of the liquid crude oil into the casing, and is sprayed onto the surface of the liquid 37 already in the casing 35. In this manner the liquid being introduced is evenly distributed on the surface of the hot crude oil liquid 37 in the dehydrator 12.

The liquid 37 in the dehydrator 12 is heated by a generally U-shaped fire tube 40 which is immersed in the liquid, or by other suitable heating device. In the embodiment shown, fuel is introduced into the tube 40 via inlet end 41 and burned, and exhaust from the tube 40 is discharged to the atmosphere through a vertical discharge tube 42.

The liquid 37 is normally maintained at a temperature of 110° to 115° C. and a pressure of close to atmospheric, i.e. less than 20 kpa. The temperature should be above the boiling point of water, but below the boiling point of the majority of the components of the crude oil. In this manner, boiling occurs at the surface 43 of the liquid 37. The surface 43 acts as a heat transfer medium, liberating water in the form of steam in a direction counter-current to the incoming crude oil. The water in the incoming crude oil tends to rapidly and vigorously boil, just as when water is dripped into a hot oil bath. Virtually all of the water in the crude oil is removed or flashed off in the dehydrator 12. Some light hydrocarbons are liberated with the water since their boiling point is below the bath temperature at the prevailing pressure, and because of steam distillation above the surface 43. Heavy or higher boiling components remain in the bath and are drawn off from the bottom of the casing.

If desired, some of the dehydrated, heavier hydrocarbons may be recycled through a line 19 and sprayed through a spray head 45 in the vapor discharge duct, to help strip some of the lower boiling hydrocarbon vapors from the discharge conduit 13. This recycled, dehydrated oil spray also acts as a foam suppressant by collapsing bubbles 46 at the surface 43 of the liquid 37. The discharge of foam with the distillate may be further inhibited by providing baffles 47 extending transversely in the casing 35 on each side of the entrance to the column 13.

What has been done is to permit the commonly used gravity vessel, namely the pressure treater, to perform the oil and water separation process using an artificial solvent or diluent. A 3° to 18° API oil is changed to an artificial 18° to 25° API synthetic crude, which encourages separation of oil/water emulsion into separate oil and water streams. This eliminates solids and salt (from salt water) contamination which remains if the crude oil is delivered directly to the evaporative dehydrator. Once the synthetic diluent has been created the pressure treater is as effective as with light conventional crude oils. Any water remaining in the crude oil (usually 0.5% to 1.5% by volume) can be evaporated in the dehydrator to yield a substantially water-free, low solids crude oil. The start-up of the process can be expedited if an outside source of diluent is initially added to the system. Once started and stabilized the system requires no further addition of diluent if the recycle embodiment is used. In effect, the dehydrator apparatus and method of this invention causes upstream and downstream conventional equipment to be more effective so that less energy is required to boil off entrained water.

We claim:

1. A method for dehydrating crude oil containing water, comprising providing a casing containing a quantity of liquid crude oil and having a liquid surface in said casing, and heating said liquid crude oil in said casing for maintaining said liquid crude oil above a distillation temperature, spraying crude oil containing water onto the surface of the heated liquid crude oil in the casing so as to cause distillation of water and light hydrocarbons from the sprayed crude oil, removing the distilled water and light hydrocarbon vapors from an upper portion of said casing above said liquid surface, and withdrawing dehydrated crude oil from a lower portion of said casing below said liquid surface.

2. A method as in claim 1 and including recycling a portion of the withdrawn dehydrated crude oil into said casing.

3. A method as in claim 1 and including condensing the water and light hydrocarbon vapors removed from said casing and separating the water from said light hydrocarbon vapors by gravity.

4. A method as in claim 3 and including diluting said crude oil containing water with the condensed, separated light hydrocarbon vapors prior to spraying the crude oil containing water into said casing.

5. A method as in claim 1 and including subjecting said crude oil containing water to a gravity separation step prior to said spraying step to remove a portion of the water and entrained solids therefrom.

6. A method as in claim 1 and including maintaining the liquid level in said casing within a predetermined range.

7. A method for dehydrating crude oil containing water, comprising subjecting said crude oil to a gravity separation step to remove a portion of the water and entrained solids therefrom and to produce partially dehydrated crude oil, providing a casing containing a quantity of liquid crude oil heated to a distillation temperature and having a liquid surface in said casing, spraying the partially dehydrated crude oil onto the surface of the heated liquid crude oil so as to cause distillation of water and light hydrocarbons from the sprayed partially dehydrated crude oil, separating the water and light hydrocarbons from the vapor by condensation, spraying a recycled portion of dehydrated crude oil in countercurrent manner to the vapors emanating from said casing, and mixing a recycled portion of the condensed light hydrocarbons with said crude oil prior to said gravity separation step.

*8. A method of dehydrating crude oil containing water, comprising:*

*providing a casing containing a quantity of liquid crude oil and having a liquid surface in said casing, and heating said liquid crude oil in said casing for maintaining said liquid crude oil above a distillation temperature,*

*distributing crude oil containing water onto the surface of the heated liquid crude oil in the casing so as to cause distillation of water and light hydrocarbons from the distributed crude oil,*

*removing the distilled water and light hydrocarbon vapors from an upper portion of said casing above said liquid surface, and*

*withdrawing dehydrated crude oil from a lower portion of said casing below said liquid surface.*

*9. A method as in claim 8 and including recycling a portion of the withdrawn dehydrated crude oil into said casing.*

*10. A method as in claim 8 and including condensing the water and light hydrocarbon vapors removed from said casing and separating the water from said light hydrocarbon vapors by gravity.*

*11. A method as in claim 10 and including diluting said crude oil containing water with the condensed, separated light hydrocarbon vapors prior to distributing the crude oil containing water into said casing.*

*12. A method as in claim 8 and including subjecting said crude oil containing water to a gravity separation step prior to said distributing step to remove a portion of the water and entrained solids therefrom.*

*13. A method as in claim 8 and including maintaining the liquid level in said casing within a predetermined range.*

*14. A method for dehydrating crude oil containing water, comprising*

*subjecting said crude oil to a gravity separation step to remove a portion of the water and entrained solids therefrom and to produce partially dehydrated crude oil,*

*providing a casing containing a quantity of liquid crude oil heated to a distillation temperature and having a liquid surface in said casing,*

*distributing the partially dehydrated crude oil onto the surface of the heated liquid crude oil so as to cause distillation of water and light hydrocarbons from the distributed partially dehydrated crude oil,*

*separating the water and light hydrocarbons from the vapor by condensation,*

*spraying a recycled portion of dehydrated crude oil in countercurrent manner to the vapors emanating from said casing, and*

*mixing a recycled portion of the condensed light hydrocarbons with said crude oil prior to said gravity separation step.*

* * * * *